C. MUELLER.
EGG-HOLDER.
No. 187,041. Patented Feb. 6, 1877.
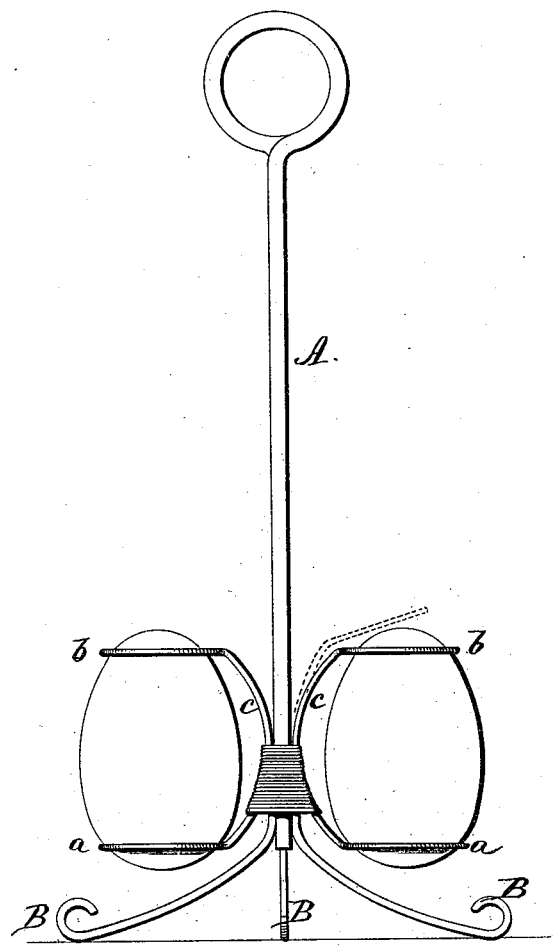
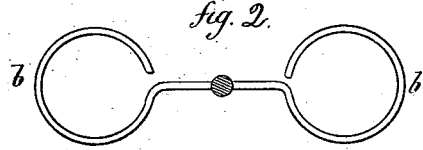

UNITED STATES PATENT OFFICE.

CHARLES MUELLER, OF NEW BRITAIN, ASSIGNOR OF ONE-HALF OF HIS RIGHT TO LOUIS LEISMANN, OF WEST MERIDEN, CONNECTICUT.

IMPROVEMENT IN EGG-HOLDERS.

Specification forming part of Letters Patent No. 187,041, dated February 6, 1877; application filed December 20, 1876.

*To all whom it may concern:*

Be it known that I, CHARLES MUELLER, of New Britain, in the county of Hartford and State of Connecticut, have invented a new Improvement in Egg-Holders; and I do hereby declare the following, when taken in connection with the accompanying drawings and the letters of reference marked thereon, to be a full, clear, and exact description of the same, and which said drawings constitute part of this specification, and represent, in—

Figure 1 a side view, and in Fig. 2 a top view.

This invention relates to a device for holding eggs, as for the purpose of boiling or for table service.

It consists in a stand or support combined with a projecting arm of ring form, and a second arm above of similar ring form, distant from each other less than the length of the egg, and one or both arms elastic, so as to be moved from each other, that one end of the egg may be set into the one and the other close down upon the opposite end of the egg, as more fully hereinafter described.

A is a vertical post or handle, provided with suitable feet B for its support. From this upright an arm, $a$, projects in the form of a ring, of less diameter than the largest diameter of the egg. Above this is a second arm, $b$, of like ring form, distant from the lower arm less than the length of the egg to be held, and the attachment of the arms to the post is such that the rings may be opened one from the other, as indicated in broken lines. This is best done by making the connection $c$ elastic. Several of these pairs of arms or rings may be attached to an upright.

To introduce the egg, raise the ring $b$ until (one end of the egg sitting into the ring $a$) the upper end of the egg will pass beneath the upper arm; then turn the upper arm down onto the ring, so that the arms both above and below inclose their respective ends of the egg. To remove the egg, reverse the operation.

Eggs may be introduced into the holder, then placed in the kettle for boiling, and the holder taken with the eggs directly to the table; or it may be used as a holder for boiling the eggs, or for table service after they have been boiled.

I claim—

The herein-described egg-holder consisting of a central support, from which project arms $a\ b$, each encircling the egg at opposite ends, and movable one from the other, substantially as described.

CHAS. MUELLER.

Witnesses:
JOHN E. EARLE,
CLARA BROUGHTON.